(12) United States Patent  (10) Patent No.: US 9,004,809 B2
Stoltenberg  (45) Date of Patent: Apr. 14, 2015

(54) MANHOLE COVER

(75) Inventor: Arne Stoltenberg, Budelsdorf (DE)

(73) Assignee: ACO Severin Ahlmann GmbH & Co. KG, Rendsburg (DE)

(*) Notice: Subject to any disclaimer, the term of this patent is extended or adjusted under 35 U.S.C. 154(b) by 0 days.

(21) Appl. No.: 14/130,766

(22) PCT Filed: Jul. 3, 2012

(86) PCT No.: PCT/EP2012/062898
§ 371 (c)(1),
(2), (4) Date: Jan. 3, 2014

(87) PCT Pub. No.: WO2013/004688
PCT Pub. Date: Jan. 10, 2013

(65) Prior Publication Data
US 2014/0144086 A1 May 29, 2014

(30) Foreign Application Priority Data
Jul. 4, 2011 (DE) .......................... 10 2011 051 545

(51) Int. Cl.
E02D 29/14 (2006.01)
B29C 70/88 (2006.01)

(52) U.S. Cl.
CPC ............ *E02D 29/1472* (2013.01); *E02D 29/14* (2013.01); *B29C 70/88* (2013.01); *E02D 29/1427* (2013.01)

(58) Field of Classification Search
CPC .. E02D 29/1427; E02D 29/1472; B29C 70/88
USPC .................................. 404/25; 52/19; 264/108
See application file for complete search history.

(56) References Cited

U.S. PATENT DOCUMENTS 3,920,347 A * 11/1975 Sauriol et al. ................... 404/25
4,786,347 A    11/1988 Angus
5,525,006 A * 6/1996 Kilman et al. .................. 404/25
6,688,806 B2 * 2/2004 Kuan .............................. 404/25

(Continued)

FOREIGN PATENT DOCUMENTS

AT        342519 B       4/1978
DE        3523518 A1     2/1986
DE        698 11 538 T2  11/2003

(Continued)

OTHER PUBLICATIONS

International Search Report and Written Opinion for PCT Application No. PCT/EP2012/062898, dated Nov. 11, 2012, 8 pages.

(Continued)

*Primary Examiner* — Raymond W Addie
(74) *Attorney, Agent, or Firm* — Westman, Champlin & Koehler, P.A.

(57) ABSTRACT

A The manhole cover is described with a supporting structure device comprising force distribution ribs for supporting a top surface of the manhole cover which can be driven over, and a hollow force distribution cylinder arranged substantially centrally, in particular a circular force distribution cylinder, for supporting the force distribution ribs, characterised by a force distribution plate to relieve the load on the force distribution cylinder, wherein the force distribution plate at least substantially completely covers an underside of the force distribution cylinder in relation to the top surface, and wherein the force distribution ribs transform smoothly into the force distribution plate.

15 Claims, 4 Drawing Sheets

(56) References Cited

U.S. PATENT DOCUMENTS

| | | | |
|---|---|---|---|
| 6,887,012 B1 * | 5/2005 | Zappe | 404/25 |
| 7,160,051 B1 * | 1/2007 | Cuny et al. | 404/25 |
| 2008/0050175 A1 * | 2/2008 | Brady et al. | 404/25 |
| 2008/0075532 A1 * | 3/2008 | Boyd | 404/25 |
| 2009/0252552 A1 * | 10/2009 | Wiedrich et al. | 404/25 |
| 2009/0290934 A1 | 11/2009 | Jordan et al. | |
| 2013/0108363 A1 * | 5/2013 | Whiteley | 404/25 |

FOREIGN PATENT DOCUMENTS

| | | |
|---|---|---|
| DE | 20 2008 006 008 U1 | 8/2008 |
| WO | 99/32274 A1 | 7/1999 |
| WO | 2005/111318 A1 | 11/2005 |

OTHER PUBLICATIONS

Examination Report for German Patent Application No. DE 10 2011 051 545.3, dated Apr. 3, 2012, 4 pages.

* cited by examiner

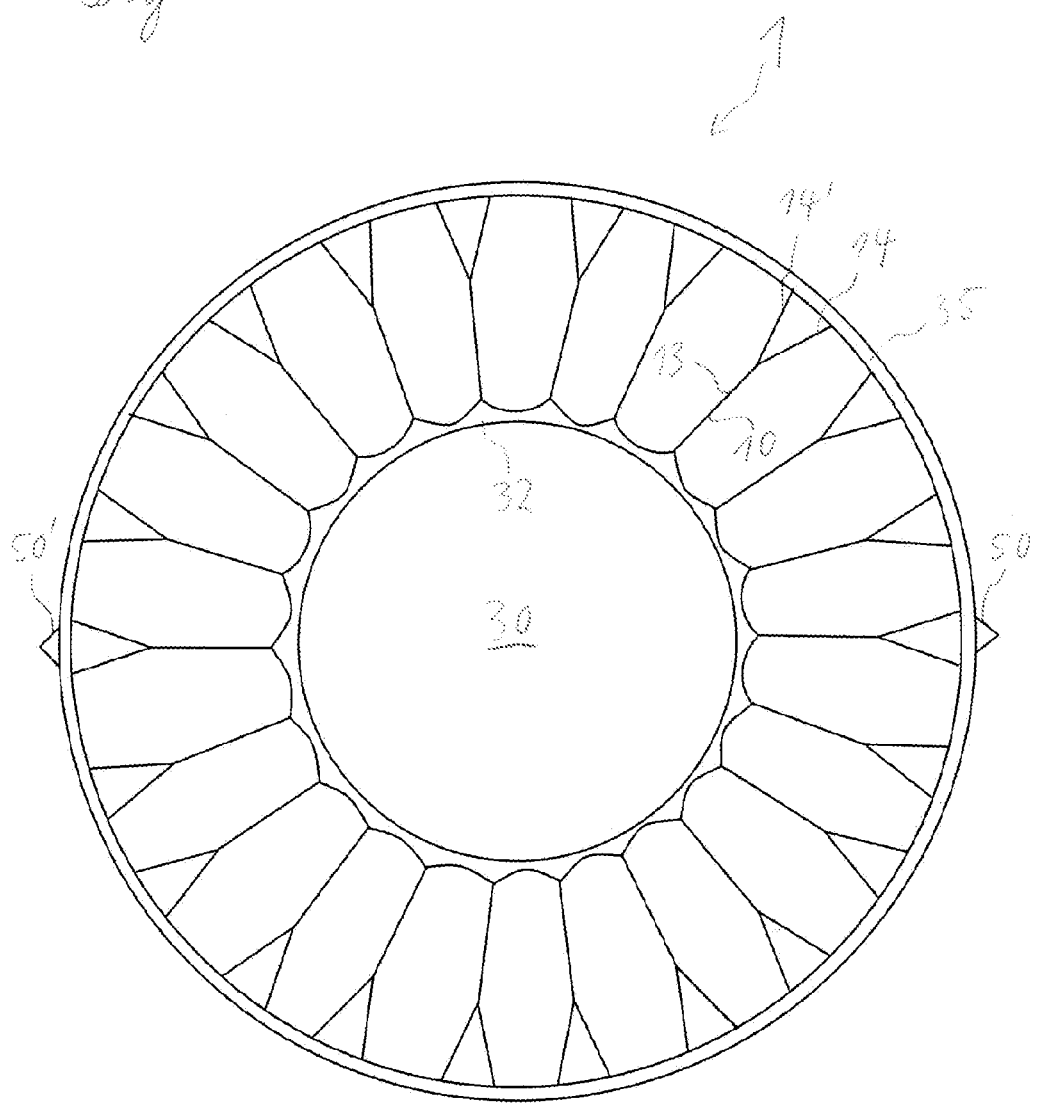

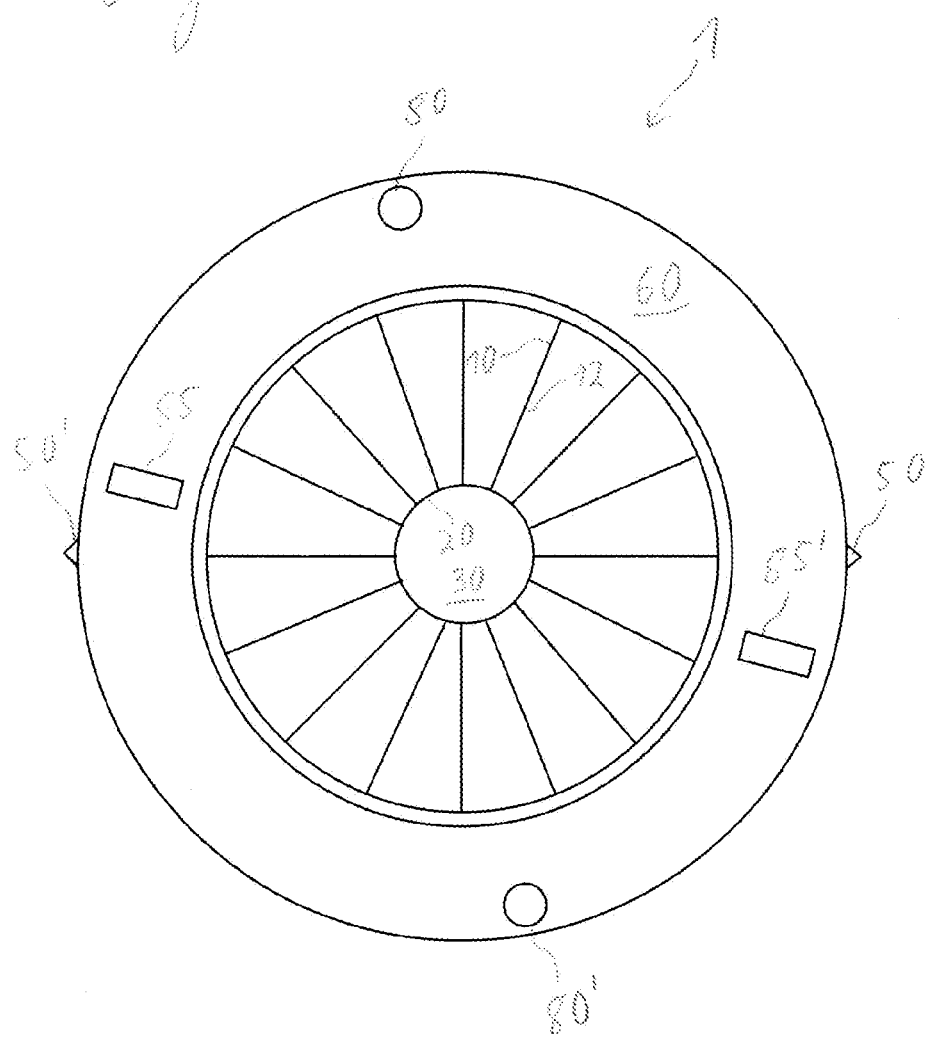

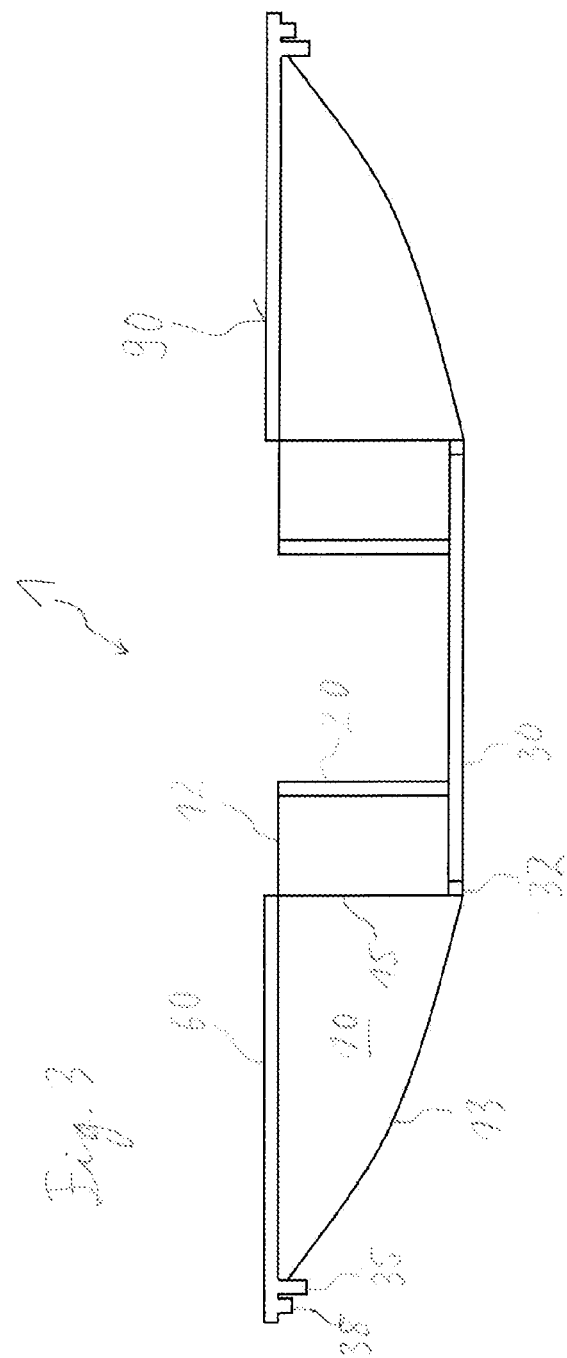

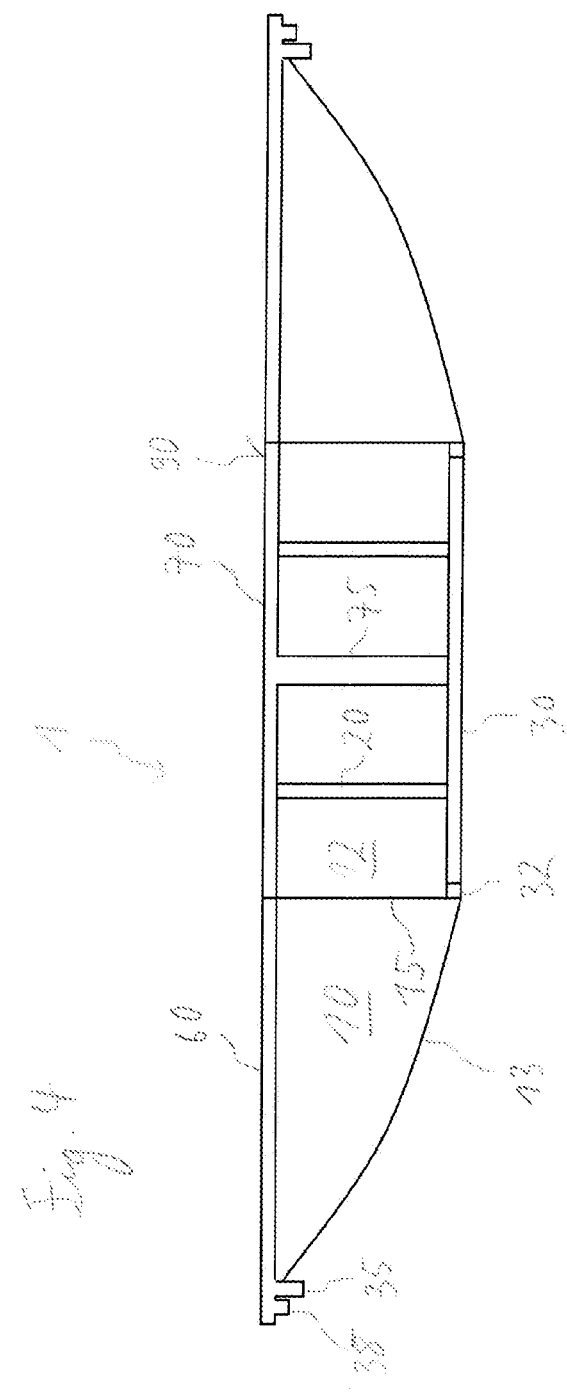

MANHOLE COVER

CROSS-REFERENCE TO RELATED APPLICATION

This Application is a Section 371 National Stage Application of International Application No. PCT/ EP2012/062898, filed 3 Jul. 2012 and published as WO 2013/004688A1 on 10 Jan. 2013, in German, the contents of which are hereby incorporated by reference in their entirety.

The invention concerns a manhole cover with a supporting structure device according to the preamble of claim 1, and a method for production of a manhole cover according to claim 15.

Manhole covers with supporting structures are known from the prior art which have a multiplicity of (radially) running force distribution ribs which open into a force distribution ring for force distribution. The force distribution ring is surrounded by a ring of high-strength material, e.g. metal, for load dissipation, to prevent failure of the supporting structure or manhole cover under load. The disadvantage with the known manhole covers or manhole covers with supporting structures is that they are technically very complex. Also the weight of the manhole cover or manhole cover with supporting structure is very high. In addition the load-bearing capacity of the manhole cover or manhole cover with supporting structure is quite low.

The invention is based on the object of indicating a manhole cover with a supporting structure device which is technically less complex while offering at least the same large load-bearing capacity.

This object is achieved by a manhole cover with a supporting structure designed according to the preamble of claim 1 and a method for production of the manhole cover according to claim 15.

In particular, the object is achieved by manhole cover with a supporting structure device comprising force distribution ribs to support a top surface of the manhole cover which can be driven over, and a substantially centrally arranged, preferably hollow force distribution cylinder, in particular a circular force distribution cylinder, to support the force distribution ribs, characterised by a force distribution plate to relieve the load on the force distribution cylinder, wherein the force distribution plate at least substantially completely covers an underside of the force distribution ribs in relation to the top surface, and wherein the force distribution ribs transform smoothly into the force distribution plate.

An essential point of the invention is that the manhole cover has a force distribution plate below the force distribution cylinder, into which plate the multiplicity of force distribution ribs open or transform smoothly. The force distribution plate relieves the load on the force distribution cylinder. An advantage of this is that the manhole cover is technically less complex while having at least the same high load-bearing capacity. Also the manhole cover requires less material for its production. The manhole cover has a lower weight for at least the same large load-bearing capacity.

In one embodiment, two or more of the following parts are connected together integrally, namely the force distribution ribs, the force distribution plate and the force distribution cylinder. An advantage of this is that an even better force transfer is thus guaranteed. Also the technical complexity of production falls.

In a further embodiment the manhole cover comprises an in particular annular outer frame for supporting the manhole cover on a substrate, wherein the outer frame then runs substantially along the outer periphery of the manhole cover. Thus the manhole cover can be supported in a technically simple manner.

In a further embodiment, the outer frame is formed integrally with the force distribution ribs. This further reduces the production complexity. Also the force transmission from the force distribution ribs to the outer frame is improved.

The manhole cover can consist of a material which comprises linear fillers and/or fibres to increase the strength of the manhole cover. An advantage of this is that the maximum load-bearing capacity of the manhole cover is increased. Also the weight of the manhole cover is further reduced. The linear fillers and/or fibres can be oriented substantially parallel to the force distribution ribs. This achieves a better force distribution or dissipation in the manhole cover. The load-bearing capacity of the manhole cover is also further increased as a result.

The manhole cover and/or the force distribution plate can have a substantially round, in particular circular outer form. With this outer form, the force distribution or force dissipation is particularly advantageous.

Alternatively the manhole cover and/or the force distribution plate can have a substantially polygonal, in particular rectangular, preferably square outer form.

An advantage of this is that the forces occurring can be conducted and dissipated better.

The outer form of the manhole cover can correspond substantially to the outer form of the force distribution plate. The advantage here is that the forces occurring in the force distribution plate can be dissipated evenly out of the manhole cover.

In a further embodiment, the force distribution ribs run substantially radially. This guarantees a particularly good distribution of the forces occurring.

Alternatively the force distribution ribs can run substantially parallel to each other. An advantage of this is that forces occurring are distributed in a direction onto several force distribution ribs. An individual force distribution rib can therefore be made less stable.

In a further embodiment, a cover plate forming at least a substantial part of the top surface can be arranged on the top of the supporting structure device. Thus the shaft can be closed technically easily.

In a further embodiment, the manhole cover comprises a cover plate, forming at least a substantial part of the top surface, on the top of the manhole cover, wherein the cover plate is formed integrally with the manhole cover. This reduces the handling complexity at the point of installation and hence the time required for installation.

In a further embodiment, at least some of the force distribution ribs divide in the direction away from the force distribution plate. The advantage of this is that on the outer edge of the supporting structure device, the distance between the (forked) force distribution ribs is smaller and hence the forces occurring can be distributed more evenly. Also the forked ribs on the edge need be made less stable, since the forces occurring are distributed over more ribs.

The object is also achieved by a method for production of a manhole cover with a supporting structure device comprising a force distribution plate, which relieves the load on the force distribution cylinder for supporting the force distribution ribs, wherein linear fillers, in particular linear fibres, are introduced into the production material of the manhole cover, and first the force distribution plate and then the force distribution ribs are injection-moulded and/or pressed from inside to outside, in order to align the linear fillers parallel to the force distribution ribs. This method creates a technically simple manhole cover with high load-bearing capacity. Also in the manhole cover produced in this method, because of the orientation of the linear fillers, a better force distribution in the manhole cover is achieved, and a better force dissipation out of the manhole cover.

Further embodiments arise from the subclaims. The invention is now explained in more detail below with reference to drawings of exemplary embodiments. The drawings show:

FIG. 1 a view from below of an embodiment of the manhole cover according to the invention with supporting structure device;

FIG. 2 a top view of the manhole cover with supporting structure device from FIG. 1;

FIG. 3 a schematic side/cross-section view of the manhole cover with supporting structure device from FIG. 1 or FIG. 2; and FIG. 4 a schematic side/cross-section view of the manhole cover with supporting structure device from FIG. 3 with a cover plate.

In the description below, the same reference numerals are used for the same parts and those with the same effect.

FIG. 1 shows a view from below of an embodiment of the manhole cover 1 according to the invention with supporting structure device. FIG. 2 shows a top view of the same embodiment of the manhole cover 1 with supporting structure device from FIG. 1. The manhole cover 1 for example covers a drainage shaft. In particular in installation regions with heavy traffic, for example a drainage shaft in the road, the shaft must be covered by means of a manhole cover which has a high load-bearing capacity. The supporting structure device is the part which substantially supports the manhole cover 1. The top surface 90 of the manhole cover 1, i.e. the surface of the manhole cover 1 which lies at the top during use, is designed to be driven over e.g. by cars or trucks. The term "top surface 90", in relation to the manhole cover 1, is not meant in the strictly geometric sense i.e. as a delimitation of a geometric cylinder.

The manhole cover 1 or the supporting structure device of the manhole cover 1 comprises radially running force distribution ribs 10 on the underside of the manhole cover 1. The force distribution ribs 10 run radiating outward, starting from the force distribution cylinder 20 arranged in the centre. The force distribution ribs 10 run radiating outward radially, at equal distances each other, from the force distribution cylinder 20. The number of force distribution ribs 10 is preferably 24. A greater or smaller number of force distribution ribs 10 is conceivable. The number of force distribution ribs 10 in the embodiment shown in the figures is 22.

The force distribution cylinder 20 is hollow and preferably has neither a bottom surface nor a top surface (in the geometric sense). The hollow force distribution cylinder 20 thus consists only of the cylinder casing. It is also conceivable that the force distribution cylinder 20 is not hollow but formed solid. In this case the force distribution cylinder 20 has a bottom and a top surface (in the geometric sense).

The force distribution cylinder 20 preferably has the form of a straight circular cylinder. It is however also conceivable that the force distribution cylinder 20 is a slanting cylinder.

Furthermore it is conceivable that the force distribution cylinder 20 is formed solely by several force distribution ribs meeting each other at one point. The force distribution cylinder 20 in this case is preferably a polygon corresponding to the number of force distribution ribs. In the case of 12 force distribution ribs which meet at one point, the force distribution cylinder has a 12-cornered base form or form of the bottom and top surface (in the geometric sense). The outer limit of the force distribution cylinder in this case is determined by the point at which the force distribution ribs transform into a closed surface or at which they become separate force distribution ribs. In such a case the force distribution cylinder is preferably solid. It is however also conceivable that in the case in which the force distribution cylinder is formed solely by several force distribution ribs meeting at one point, the force distribution cylinder is hollow.

The force distribution cylinder 20 can in particular be a circular force distribution cylinder. Other basic forms of force distribution cylinder 20, i.e. other shapes of the bottom or top surface (in the geometric sense but physically not present) of the force distribution cylinder 20, such as for example elliptical or rectangular, are conceivable. In particular the force distribution cylinder 20 can also be a (regular) polygon e.g. 24-cornered, as the base form of the bottom or top surface (in the geometric sense but physically not present). In the prior art, the force distribution cylinder 20 is also called the force distribution ring.

The manhole cover 1 or the supporting structure device of the manhole cover 1 furthermore comprises a force distribution plate 30. In the embodiment examples shown in FIGS. 1 to 4, the force distribution plate 30 (apart from the outer ring 32) is substantially circular. It is however also conceivable that the force distribution plate 30 is formed polygonal, in particular rectangular or square, or elliptical.

The force distribution plate 30 covers the underside of the force distribution cylinder 20. This does not however mean that the force distribution plate 30 necessarily touches the force distribution cylinder 20. The force distribution cylinder can stand in direct contact with the force distribution plate 30 or have a distance from the force distribution plate 30. The force distribution plate 30 is consequently on the opposite side to the top surface 90 in relation to the force distribution cylinder 20. The force distribution plate 30 can also be larger than the force distribution cylinder 20 or the underside of force distribution cylinder 20.

The thickness of the force distribution plate 30 can be adapted on production to the desired load-bearing capacity of the finished manhole cover.

In the case of a rectangular (not square) outer form of the manhole cover 1, the force distribution ribs 20 preferably run parallel to each other. In the case of a square or polygonal outer form, i.e. an outer form with more than four corners, of the manhole cover 1, the force distribution ribs 10 preferably run radially out from the force distribution cylinder 20. In principle the force distribution ribs 10 can run radially or parallel to each other, irrespective of the outer form of the manhole cover 1 or the outer form of the force distribution plate 30.

The force distribution plate 30 has an annular outer ring 32. In the region of the outer ring 32, the force distribution ribs 10, or the lower part of the force distribution ribs 10, transform smoothly into the force distribution plate 30. This means that the force distribution ribs 10, or their lower part, open into the force distribution plate 30 in the region of the outer inner ring 32 of the force distribution plate 30. Therefore there are substantially no almost right-angled corners at which very high load forces occur. The force distribution ribs 10, in particular on the lower part of the force distribution ribs 10, transform smoothly into the force distribution plate 30. A part or the upper part of the force distribution ribs 10 runs above the force distribution plate 30 and is connected to the force distribution cylinder 20.

In other embodiments of the force distribution plate 30, the outer ring 32 consequently has a correspondingly different form.

The outer ring 32 of the force distribution plate 30 has U-shaped recesses between the points at which the force distribution ribs 10 come into direct contact with the force distribution plate 30 or the outer ring 32 of the force distribution plate 30. In other words, the force distribution ribs 10 or the lower part of the force distribution ribs 10 widen more and more in the direction of force distribution plate 30, in the region of the outer ring 32 of the force distribution plate 30, until they form a closed surface, namely the force distribution plate 30. The lower or bottom part of the force distribution ribs 10 therefore widens more and more until all force distribution ribs 10 form a single cohesive surface. This cohesive surface is the outer ring 32 of the force distribution plate 30 or the force distribution plate 30 itself.

An annular outer frame 35 runs in the vicinity of the outer periphery of the manhole cover 1 or the supporting structure device of the manhole cover 1. The force distribution ribs 10 end at the outer frame 35. The force distribution ribs 10 are connected with this outer frame 35. The form of the outer frame 35 is substantially determined by the outer peripheral form of the manhole cover 1 or the surface of the manhole cover 1. With a different shape of manhole cover 1, the outer frame 35 has a corresponding different shape.

After around three quarters of the way from the outer ring 32 of the force distribution plate 30 to the outer frame 35, the force distribution ribs 10 each divide into force distribution ribs 14, 14'. It is also conceivable that only some of the force distribution ribs 10 divide. It is also conceivable that the force distribution ribs 10 divide at a point which lies closer to the outer ring 32 of the force distribution plate 34 or closer to the outer frame 35. By this division of the force distribution ribs 10, the forces occurring are distributed even better at or in the outer frame 35. It is also conceivable that the force distribution ribs 10 divide into more than two force distribution ribs, for example into three, four or more forked force distribution ribs. The greater the number of forked force distribution ribs into which a force distribution rib divides, the smaller the distance of the forked force distribution ribs from each other. Thus the force is distributed more evenly on the outer edge as the number of forked force distribution ribs rises, and the individual forked force distribution ribs need therefore resist smaller load forces and hence can be formed less stable.

The force distribution ribs 10 run substantially perpendicular to the upper surface of the manhole cover 1. The height of the force distribution ribs 10 or the forked force distribution ribs 14, 14' diminishes continuously from the force distribution cylinder 20 or the outer ring 32 of the force distribution plate 30 to the outer frame 35. The width of the force distribution ribs 10 or forked force distribution ribs 14, 14' at all points is substantially constant. It is however also conceivable that the width increases or diminishes.

A part of the surface of the manhole cover 1 forms a closed surface 60. The open part of the surface of the manhole cover 1 corresponds in size and (horizontal) position to around the size and (horizontal) position of the force distribution plate 30. For this reason, in the view from below in FIG. 1, only the force distribution plate 30 and the closed surface 60 of the manhole cover 1 can be seen.

It is also conceivable that the open part of the surface of the manhole cover 1 is greater or smaller than the force distribution plate 30 or offset horizontally thereto. The force distribution plate 30 runs substantially parallel to the surface of the manhole cover 1.

It is also conceivable that the upper surface of the manhole cover 1 is completely open or completely closed.

The manhole cover 1 with supporting structure device has a groove 45 on the inner periphery of the closed surface 60. This circumferential groove 45 serves for fixing of a cover plate 70 which can be arranged on the manhole cover 1.

Two diametrically opposed extraction openings 85, 85' are arranged in the closed surface 60 of the manhole cover 1. These serve for easier lifting of the manhole cover 1, in particular for removal of the manhole cover 1 from the shaft or for its introduction therein. It is conceivable that the extraction openings 85, 85' are protected from dust and dirt by means of a (plastic) protection.

Also two diametrically opposed recesses 80, 80' are provided in the closed surface 60 for pretensioning devices of an O-ring. The O-ring (not shown) serves as a seal between the manhole cover 1 and the surface on which the manhole cover is laid.

The manhole cover 1 also has two triangular alignment elements 50, 50' which are arranged at two opposing points on the periphery of the manhole cover 1. They serve to align the circular manhole cover 1 accordingly. Other forms of alignment elements 50, 50', for example rectangular or elliptical or circular, are conceivable.

The force distribution ribs 10 are preferably formed integrally or connected together integrally with the force distribution plate 30. In addition or alternatively, the force distribution plate 30 can be formed integrally or connected together integrally with the force distribution cylinder 20. In addition, alternatively or additionally, the force distribution ribs 10 and the force distribution cylinder 20 can be formed integrally or connected together integrally. Preferably all three said elements, i.e. the force distribution ribs 10, the force distribution cylinder 20 and the force distribution plate 30, are formed integrally with each other or connected together integrally. Also alternatively or additionally, the force distribution ribs 10 can be formed integrally with the outer frame 35.

The material from which the manhole cover 1 with the supporting structure device, or the supporting structure device, can consist in particular of a plastic, e.g. polypropylene, and/or metal. Preferably the manhole cover 1 consists completely of a plastic or a plastic composite.

The materials used can contain linear fillers, e.g. fibres, to retain the strength properties of the supporting structure device or the manhole cover 1 with reduced material usage (and hence lower weight). It is advantageous to align the linear fillers substantially parallel to the force distribution ribs 10 on production of the manhole cover 1 or supporting structure device of the manhole cover 1. With this arrangement, the strength properties of the manhole cover 1 can be further improved and additional material saved, in order to achieve a sufficiently strong manhole cover 1. The fibre orientation is preferably achieved in that the production material with fibres is introduced into the force distribution plate 30 and this material then pressed radially from inside to outside into the force distribution ribs 10 (for example by injection-moulding or pressing).

The force distribution plate 30 preferably has a thickness which corresponds substantially to the wall thickness of the force distribution cylinder 20. It is also conceivable that the force distribution plate 30 has a greater or lesser thickness than the walls of the force distribution cylinder 20.

FIG. 3 shows the side/cross-section view of the manhole cover 1 with a supporting structure device from FIG. 1 or FIG. 2. The force distribution ribs 10, which run between the outer frame 35 and the force distribution cylinder 20 or the force distribution plate 30, have an inner part 12 and an outer part 13. The inner part 12 of the force distribution ribs 10 runs, starting from the force distribution cylinder 20, above the force distribution plate 30 in the direction of the outer frame 35. The inner part 12 of the force distribution ribs 10 ends approximately above the outer ring 32 of the force distribution plate 30. This means that the outer ring 32 has around the same radial distance from the centre of the manhole cover as the outer end of the inner part 12 of the force distribution ribs 10.

The outer part 13 of the force distribution ribs 10 is the part of the force distribution ribs 10 which extends from the outer frame 35 up to the radial distance from the middle of the manhole cover 1 which corresponds to the radial distance of the outer ring 32 of the force distribution plate 30.

It is also conceivable that the inner part 12 extends further out or that the outer part 13 of the force distribution ribs 10 extends further inward. A membrane 15 can be arranged between the inner part 12 of the force distribution ribs 10 and the outer part 13 of the force distribution ribs 10. The membrane 15 can in particular be formed air-tight. The membrane 15 runs substantially vertically between the inner part 12 and outer part 13 of each two force distribution ribs 10. This means that the membrane 15 is tensioned between each two force distribution ribs 10. The height of the membrane 15 corresponds substantially to the height of the force distribution cylinder 20. The lower end of the membrane 15 is in direct contact with the outer ring 32 of the force distribution plate 30 or the force distribution plate 30 itself.

In this way, in use the part of the surface of the manhole cover 1 which is not closed is separated from the lower part of the shaft which lies below the manhole cover 1. If the manhole cover 1 is mounted air-tight on the support surface by means of the sealing ring 38, for example by an O-ring between the sealing ring 38 and the support surface, and the force distribution cylinder 20 is in direct contact with the force distribution plate 30 or formed integrally with the force distribution plate 30, an air-tight closure of the shaft is thus achieved.

The force distribution ribs 10 are preferably formed integrally, i.e. the inner part 12 of the force distribution ribs 10 is formed integrally with the outer part 13 of the force distribution ribs 10.

Outside the outer frame 35, which is formed by a downward protrusion, is a sealing ring 38. The form of the outer frame 35 and the form of the sealing ring 38 correspond substantially to the outer form of the manhole cover 1. This means that for a substantially circular outer form of the manhole cover 1, the outer frame 35 and the sealing ring 38 are each annular. For a rectangular outer form of the manhole cover 1, the outer frame 35 and the sealing ring 38 are also rectangular.

The sealing ring 38 consists of a protrusion with a smaller height than the outer frame 35 for supporting the manhole cover 1. This means that the protrusion of the outer frame 35 extends further down than the protrusion of the sealing ring 38. The sealing ring 348 and/or the outer frame 35 can be formed integrally with the closed surface 60 of the manhole cover 1.

A rubber seal, e.g. an O-ring, can be arranged between the sealing ring 38 and the surface on which the manhole cover 1 is mounted. This leads to an air-tight seal at the edge of the manhole cover 1. Also a slipping of the manhole cover, when a vehicle drives over the manhole cover, is substantially prevented.

The support surface is for example a concrete ring with protruding inner edge. The manhole cover 1 rests with the outer frame 35 on the inner edge of the concrete ring.

FIG. 4 shows a further side/cross-section view of the manhole cover 1 in FIG. 3. A cover plate 70 is arranged on the manhole cover 1. The cover plate 70 comprises a support element 75 which supports the cover plate 70 centrally. The support element 75 rests on the top of the force distribution plate 30. The cover plate 70 closes the part 60 of the surface of the manhole cover 1 which was not previously closed. The cover plate 70 terminates flush with the closed surface 60 of the manhole cover 1. The cover plate 70 can be closed or have one or more openings.

The cover plate 70 forms at least a substantial part of the top surface 90 of the manhole cover 1. The top surface 90 in the embodiment shown thus consists of the closed surface 60 of the manhole cover 1 and the cover plate 70 or top of the cover plate 70. The manhole cover 1 is arranged in the shaft preferably such that the top surface 90 of the manhole cover 1 lies flush with the surrounding surface or terminates flush therewith. Thus there are no edges at the transition from the surrounding surface and the top surface 90 of the manhole cover 1.

LIST OF REFERENCE NUMERALS

1 Manhole cover
10 Force distribution ribs
12 Inner part of force distribution ribs
13 Outer part of force distribution ribs
14, 14' Forked force distribution ribs
15 Membrane
20 Force distribution cylinder
30 Force distribution plate
32 Outer ring of force distribution plate
35 Outer frame
38 Sealing ring
45 Groove
50, 50' Alignment elements
60 Closed surface of manhole cover
70 Cover plate
75 Support element of cover plate
80, 80' Receivers for O-ring pretension devices
85, 85' Extraction openings
90 Top surface

The invention claimed is:

1. A manhole cover with a supporting structure device comprising:
   force distribution ribs for supporting a top surface of the manhole cover which can be driven over, and
   a preferably hollow force distribution cylinder arranged substantially centrally, in particular a circular force distribution cylinder, to support the force distribution ribs, characterized by
   a force distribution plate to relieve the load on the force distribution cylinder, wherein the force distribution plate at least substantially completely covers an underside of the force distribution cylinder in relation to the top surface, and wherein
   the force distribution ribs transform smoothly into the force distribution plate.

2. The manhole cover according to claim 1, characterized in that two or more of the following parts are connected together integrally, namely the force distribution ribs, the force distribution plate and the force distribution cylinder.

3. The manhole cover according to claim 1, characterized by an in particular circular outer frame for supporting the manhole cover on a substrate, wherein the outer frame runs substantially along the outer periphery of the manhole cover.

4. The manhole cover according to claim 3, characterized in that the outer frame is formed integrally with the force distribution ribs.

5. The manhole cover according to claim 1, characterized in that the manhole cover consists of a material which comprises linear fillers and/or fibres to increase the strength of the manhole cover.

6. The manhole cover according to claim 5, characterized in that the linear fillers and/or fibres are oriented substantially parallel to the force distribution ribs.

7. The manhole cover according to claim 1, characterized in that the manhole cover and/or the force distribution plate have a substantially round, in particular circular outer form.

8. The manhole cover according to claim 1, characterized in that the manhole cover and/or the force distribution plate have a substantially polygonal outer form.

9. The manhole cover according claim 1, characterized in that the outer form of the manhole cover corresponds substantially to the outer form of the force distribution plate.

10. The manhole cover according to claim 1, characterized in that the force distribution ribs run substantially radially.

11. The manhole cover according to claim 1, characterized in that the force distribution ribs run substantially parallel to each other.

12. The manhole cover according to claim 1, characterized in that a cover plate forming at least a substantial part of the top surface can be arranged on the top of the manhole cover.

13. The manhole cover according to claim 1, characterized by a cover plate forming at least a substantial part of the top surface on the top of the manhole cover, wherein the cover plate is formed integrally with the manhole cover.

14. The manhole cover according to claim 1, characterized in that at least some of the force distribution ribs divide in the direction away from the force distribution plate.

15. A method for production of a the manhole cover with a supporting structure device comprising a force distribution plate, which relieves the load on a force distribution cylinder for supporting the force distribution ribs, wherein linear fillers, in particular linear fibres, are introduced in the production material of The manhole cover and first the force distribution plate and then the force distribution ribs are injection-moulded and/or pressed from inside to outside, in order to orient the linear fillers parallel to the force distribution ribs.

* * * * *